July 4, 1950  L. C. WATERMAN ET AL  2,513,386
ELECTRIC TREATER
Filed March 27, 1940
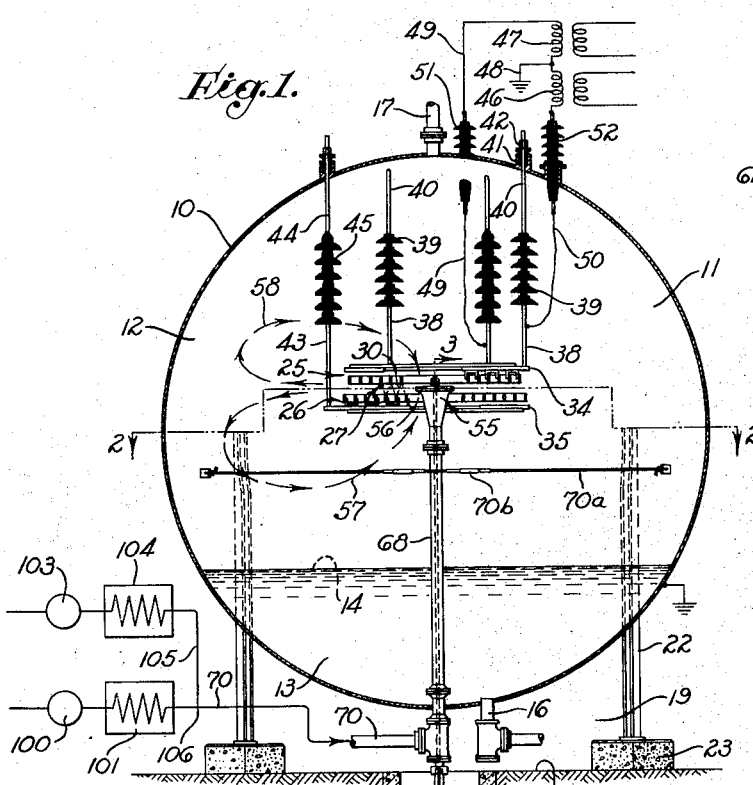
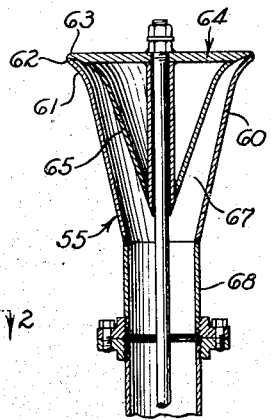
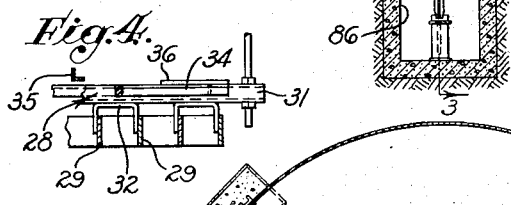
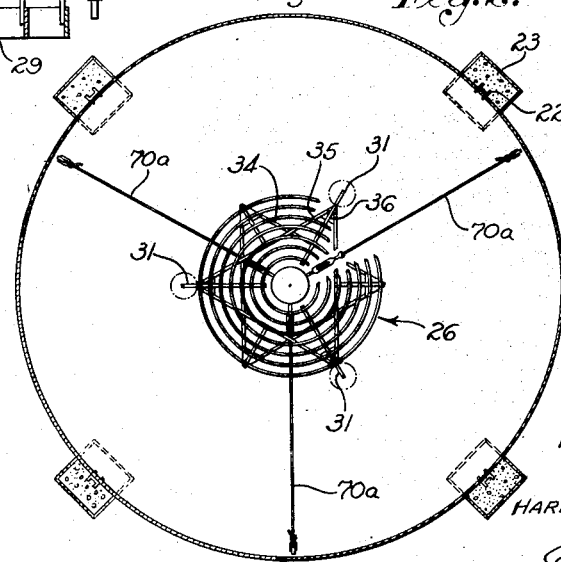
INVENTORS
LOGAN C. WATERMAN
GORDON B. HANSON
BY
HARRIS, KIECH, FOSTER & HARRIS
*Clarence F. Kiech*
FOR THE FIRM
ATTORNEYS Patented July 4, 1950

2,513,386

UNITED STATES PATENT OFFICE 2,513,386

ELECTRIC TREATER

Logan C. Waterman and Gordon B. Hanson, Houston, Tex., assignors to Petrolite Corporation, Ltd., Wilmington, Del., a corporation of Delaware Application March 27, 1940, Serial No. 326,274

7 Claims. (Cl. 204—302)

Our invention relates to the electric treatment of emulsions and, more particularly, to a novel electric treater useful in electric dehydration of crude oils or electric purification processes.

In the electric resolution of crude oil emulsions or artificially formed emulsions, it is customary to employ a high-potential electric field to which the emulsion is subjected. One action taking place in the field is the coalescence of various dispersed droplets of water, and it is usually desirable that the treated oil and water constituents be separated in the general vicinity of the electrodes. Correspondingly, both electric treatment and separation may desirably take place in the same container. Containers heretofore used have been of the cylindrical type, usually in upright position with heads closing the upper and lower ends thereof.

It is an object of the present invention to provide in an electric treating system a container which is of generally spherical form, by which term we have reference to a form which is truly spherical or substantially spherical, e. g., in the nature of a spheroid. This generally spherical form permits economies in materials and is especially well adapted to withstand the internal pressures which are often desirable in this art. A container of this nature may be constructed of thinner metal and may have a much reduced gross weight than a cylindrical container designed to operate under similar conditions, being thus both lighter and cheaper.

It is another object of the invention to provide a container for an electrode means which is of large cross-sectional area in the region of active electric treatment and settling, and which minimizes the gross volume of fluid required to be within the container. For example, a 20' diameter sphere contains approximately 750 bbls. of fluid, a 20' diameter by 20' high cylindrical container would contain approximately 1125 bbls. of fluid so that the spherical container would represent a reduction of about 33% in the volume of the fluid therein. This reduction in volume of the fluid being processed permits operation of the treater at materially higher volumetric efficiency, i. e., a higher ratio of gross throughput to the fluid present in the process.

It is another object of the invention to provide an electric treater comprising a container and an electrode system therein adapted to treat emulsions while at elevated temperature, the container being of a form to minimize the radiation loss to the atmosphere and which loss would result in decreased or differential temperatures being present in the treater. By use of a generally spherical container, the actual exposed surface of the treater containing a given amount of fluid is less than if a cylindrical container of similar volume were used. Also, in such a container, circulation conditions can be made more uniform to eliminate stagnant or quiescent zones conductive to differential temperatures within the container.

Another object of the invention is to provide an electric treater of enhanced capacity. The capacity of the treater is determined primarily by the cross-sectional area and volume of the active treating zone, rather than by its gross volume or overall height. The treating zone in the present invention is positioned generally at or near the equatorial section and various advantages accrue from this arrangement.

It is a further object of the invention to dispose an electrode means within a generally spherical container in such manner as to obtain new and valuable internal relationships as, for example, facilitating the establishment of circulation paths within the container, facilitating separation of the coalesced water masses, etc., as will be hereinafter pointed out in greater detail.

It is another object of the invention to use a generally spherical container for an electrode system and to support this container at a position above the ground. Various accessories or controls can be positioned in the intervening space to be readily accessible yet protected in large measure from the elements.

Further objects and advantages of the invention will be made evident hereinafter.

Referring to the drawing, in which one embodiment of the invention is shown for illustrative purposes:

Figure 1 is a vertical sectional view of the treater of the invention with certain of the incoming piping indicated diagrammatically;

Figure 2 is a horizontal sectional view, taken as indicated by the line 2—2 of Figure 1;

Figure 3 is a vertical sectional view of the emulsion-distributing system shown in Figure 1;

Figure 4 is an enlarged detail of the right-hand side of the upper electrode shown in Figure 1, partially in vertical section showing the manner of constructing the same.

Referring particularly to Figures 1 and 2, the generally spherical container is indicated by the numeral 10 and is fabricated in any desired manner, as by welding or riveting pre-formed segmental sections or hemispheres. This container provides an internal chamber 11 in which electrically-treated emulsion constituents can separate to form an upper body of oil 12 and a lower body of water 13, the body of water being shown as providing an upper surface 14.

Means is provided for separately withdrawing oil and water from the extremities of the chamber 11. For example, water may be withdrawn through a pipe 16 in such amount as to maintain the position of the surface 14 substantially uniform. Such control of the water effluent can be effected by use of any of the methods well known in this electric treating art. The oil can be withdrawn from the chamber 11 through a pipe 17 in any well-known manner. Preferably, both the pipes 16 and 17 are provided with back pressure valves to permit maintenance of superatmospheric pressure in the chamber 11 sufficient to prevent the liberation of vapors within this chamber. The invention is not limited as to the degree of pressure maintained. If the temperature of the incoming emulsion is from about 120° F. to about 210° F., a pressure of 25-50 lbs./sq. in. in the container 10 will prevent vaporization of the more volatile fractions. In some instances, higher temperatures and correspondingly higher pressures can be used without departing from the spirit of the invention.

The spherical container 10 is preferably supported above the ground 18 to provide a space 19 which gives access to the pipe 16, as well as to various other equipment which may be disposed therein, for example, suitable controls or energizing equipment. In Figures 1 and 2, the container 10 is shown as being supported by pedestals 22 resting on piers 23 and conforming in shape at their upper ends to the periphery of the container 10. Preferably, these pedestals are welded or otherwise secured to the container near the midsection thereof.

A suitable electrode means is disposed in the chamber 11 to aid in the resolution of the emulsion. The shape of the container can be made to cooperate with such electrode means in a novel manner and to assist the process generally if the electrode means is disposed near the midsection or equatorial zone of the container 10. Figures 1, 2, and 4 show the structural details of the preferred electrode means, though various other electrode structures can be used. In general, the electrode means shown includes an upper electrode 25 and a lower electrode 26 spaced to define a treating space 27.

Various advantages can be obtained by disposing the electrodes at or near the midsection of the generally spherical container. For example, such disposition permits the electrodes to be in that zone of the container which is of largest diameter. This permits use of electrodes of greater area, gives a greater area for settling of the water if the emulsion is discharged radially outward into the treating space 27, and permits the use of higher incoming velocities. In addition, such higher velocities can be used without danger of setting up excessive internal turbulence, and without strong impingement on the walls of the container, thus preventing re-dispersion and re-emulsification. As the settling area in the vicinity of the field can thus be relatively large, it follows that separation of coalesced water masses is facilitated and the oil environment in which the electrodes are positioned can be of somewhat higher resistivity. In addition, there is less chance for short-circuits between the electrodes and the grounded container if these electrodes are disposed near the midsection. The electrodes can be disposed either at the midsection or near this midsection, as shown, for example, in Figure 1.

Various forms of electrodes can be used but, in the preferred embodiment, each of these electrodes is of interstitial character. As shown, each electrode includes a supporting structure 28 and a plurality of concentric rings 29 extending toward the opposite electrode but disposed at such radial position as to be opposite the spaces between corresponding annular rings on this other electrode so that the most intense portions of the field between the electrodes will lie along inclined paths, as indicated by the numeral 30 of Figure 1.

The supporting structure 28 of each electrode preferably includes a plurality of radial arms 31 of channel form to which are fixed U-shaped supporting members 32 to which adjacent rings 29 are secured to be held in concentric relationship. The arms 31 are suitably secured to a star-shaped support comprising superimposed triangular-shaped structures 34 and 35 welded or otherwise secured together to form the general pattern shown in Figure 2. Each triangular structure may comprise three angle iron members attached by gussets 36 to which the arms 31 may be secured at their outer ends. Such a star-shaped structure can be used to support the different radial arms 31 in a horizontal plane and thereby retain all the field-bounding annular edges of the concentric rings 29 in a desired horizontal disposition. Figure 4 shows a portion of the upper electrode 25 and it will be apparent that the construction of the lower electrode 26 can be similar, the corresponding structure 28 being in this instance below the concentric rings.

The upper electrode 25 is suspended by a plurality of vertically-extending rods 38 attached to the arms 31. In turn, the rods 38 are suspended from strings of insulators 39 hung on rods 40 extending from the container 10 through suitable stuffing boxes 41. The upper ends of each rod 40 may be threaded to receive a nut 42 to permit adjustment of the vertical position of the attached electrode. In like manner, the lower electrode 26 is suspended on rods 43 and 44 with intermediate strings of insulators 45, and similar provision can be made for vertical adjustment of this lower electrode.

The spherical shape of the container 10 permits the rods 38, 40, 43, and 44 to be shorter than would be the case if the top of the container were flat, for these rods are not grouped closely around the vertical central axis of the container but are, in effect, spaced peripherally around the electrode means. This construction provides for better insulation, due to the wider spacing of the insulators and the greater space between these insulators and the container walls, as compared to conditions in an equal-volume cylindrical container. Further, this construction provides a more rigid support for the electrodes, due both to the peripheral attachment of the rods to the electrodes and to the fact that the rods can be made shorter than if the container 10 were formed in a conventional cylindrical manner.

The electrodes are energized by use of a high potential which, in the embodiment shown, is of an alternating character. In this connection, transformers 46 and 47 are shown connected in additive relation, with the common terminal of the secondary windings grounded as indicated at 48, and thus being connected to the grounded container 10. The high voltage terminal of the secondary winding of the transformer 47 is connected by a conductor 49 with the lower electrode 26, while the high tension terminal of the transformer 46 is connected by a conductor 50 to the upper electrode 25. Suitable high tension bushings 51 and 52 serve to insulate the conductors 49 and 50 at the point of entry into the container. With this construction, the potential between the upper and lower electrodes will be equal to the sum of the potentials developed by the transformers 46 and 47, yet the potential between either of these electrodes and any grounded portion of the system will be equal only to the potential of a single transformer. This condition is very desirable as it tends to prevent short-circuiting to the container or to other grounded elements, for example the emulsion distribution system.

We find it desirable to discharge the emulsion to be treated directly into the treating space 27. This can be accomplished by extending an emulsion distributor 55 upward into a throat 56 of the lower electrode 26. The constructional details of the preferred emulsion distributor will be hereinafter described. Suffice it to say here that this distributor is well adapted to discharge a stream of the emulsion radially outward in a horizontal plane into the treating space 27.

Such radial discharge near the midsection of the container 10 produces several advantageous results. In the first place, it will be apparent that the aspirating action of the emulsion thus discharged will draw into the treating space 27 through the throat 56 some of the previously-treated material occupying the zone below the lower electrode 26. In fact, such introduction of the incoming emulsion will tend to establish a lower closed circulation path, as indicated by the arrows 57, and an upper closed circulation path, as indicated by the arrows 58. It will be further apparent that the spherical shape of the container 10 assists in guiding the recirculated material through these paths, for the curved surfaces thereof act as deflectors tending to deflect the liquid from an upward or downward path toward the center of the sphere. In addition, the length of the upper circulation path can be made somewhat smaller than the lower recirculation path if a spherical container is used with the emulsion being discharged in the position shown, as distinct from the situation if an equal-diameter container with a cylindrical side wall is employed, in which event the paths are more nearly of the same length.

The material circulated through the lower path 57 generally is of lower resistivity and higher water content than that moved through the upper path 58, and retreatment of the material of higher water content is very desirable as aiding complete resolution. Thus, if a single passage through the field has not produced coalescence of some of the water masses to a size sufficient to be readily separable, additional coalescence will be effected by retreatment in the treating space 27. In fact, some of the smaller water masses or sludge particles may be recirculated repeatedly until coalesced to such an extent as to be separable.

We prefer to carry the surface 14 of the body of water below the midsection of the spherical container 10. The position shown in Figure 1 is illustrative and, in some instances, a somewhat higher water level will be desirable. In any event, it will be apparent that the material in a zone between the plane of the lower electrode 26 and the surface 14 will be subjected to gravitational separation and that the larger water masses will move downward therein.

By carrying the water level below the midsection, separation of the water masses in the outer portion of this zone is facilitated. For example, a water mass moving downward in the outer portion of this zone may contact the curved wall of the container 10 and flow along this wall into the main body of water 13. In fact, the inner surface of this container can be wet with water in the outer portion of this zone so that a coalesced water mass coming into contact with the water-wet surface will spread into a film, and the curved portion of the container will guide the water directly to the main body of water. In this way, some of the water masses can be separated from the oil at a quicker rate than if they were required to settle through the oil to reach the surface 14.

It will be apparent that an auxiliary field will be set up in such a zone between the lower electrode and the surface 14 for the body of water 13 is at ground potential. This auxiliary field treats the constituents moving through the circulation path 57 and is otherwise desirable in the process.

The emulsion-distributing system which is preferred for use in the invention is best shown in Figures 1 and 3. Referring thereto, the emulsion distributor 55 includes an upwardly-diverging outer member 60 which is flared, as indicated at 61, and which terminates in a radially-extending lip 62. Cooperating with this lip is a lip 63 of an inner or head member 64 and which, when raised from the lip 62, provides an annular space through which the emulsion is jetted outward. This annular space is preferably designed to divert the outward-flowing emulsion slightly upward, a deviation of about 1° from the horizontal being found desirable. The head member 64 preferably provides an inward tapered portion 65 which, in effect, spreads the emulsion stream moving upward in the outer member 60. The taper on the outer and head members 60 and 64 may be different so as to provide an annular emulsion passage 67 of decreasing cross-sectional area toward the lips 62 and 63. In this manner, high turbulence in the distributor just prior to discharge of the emulsion can be avoided as the emulsion can be made to accelerate rather uniformly and a streamlined flow can be established.

The distributor 55 is positioned on a riser pipe 68 which extends downward to a T 69, the transverse leg of which is connected to a pipe 70 through which the emulsion enters the riser pipe 68. This riser pipe extends centrally upward in the container 10 and is held rigid by guy wires 70a (Figure 1) which are secured to the inside of the container and each of which includes a turnbuckle 70b to permit accurate centering of the distributor with respect to the electrodes. The lower leg of the T 69 is closed by a plate 71 to which a packing sleeve 72 is suitably secured, as by welding. Extending upward through the packing sleeve is a rod 75 which extends entirely through the riser pipe 68 and is connected to the head member 64 of the distributor 55. A packing 73 is disposed in the packing sleeve 72 and compressed by a gland 74 to produce a fluid-tight joint, while still permitting vertical movement of the rod 75 to control the position of the head member 64 of the distributor.

Suspended below the packing sleeve 72, as by a plurality of webs 76, is a spring-loading structure 77 acting to move the rod 75 resiliently downward. As best shown in Figure 3, this spring-loading structure includes a sleeve 78 suitably connected to the webs 76 and internally threaded to receive an adjusting sleeve 79 which surrounds the rod 75. Engaging the lower end of the adjusting sleeve 79 is the upper race of a ball-bearing 80 of the thrust type, the lower race fitting in a pocket in a plate 81 which can slide along the rod 75. A similar plate 82 surrounds the lower end of the rod 75 and bears against a nut 83 threaded to this rod. Compressed between the plates 81 and 82 is a compression spring means, shown as including an outer spring 84 and an inner spring 85. These springs tend to pull the rod 75 downward and this tendency is overcome by the lifting action exerted on the head member 64 by the emulsion which is being forced through the distributor 55. Correspondingly, the distance across the annular discharge opening of the distributor 55 will vary with the amount of emulsion being forced into the riser pipe, and equilibrium will be established between the tendency of the emulsion to move the distributor open and the tendency of the spring means (84, 85) to close the distributor.

The amount of the pressure drop developed by the emulsion distributor can be varied, as can also the jet velocity into the treating space, by varying the degree of compression of the springs 84 and 85. Such adjustment can be effected by turning the adjusting sleeve 79 to force the plate 81 up or down. Such change in angular position of the adjusting sleeve can be accomplished by extending a wrench or other suitable tool between the webs 76.

We prefer to dispose the spring-loading structure 77 in a pit 86 (Figure 1) and to enclose the spring means. This can be accomplished by use of an upper plate 87, secured to the sleeve 78, together with a lower plate 88 below the rod 75. Fitting into corresponding annular grooves of these plates is a cylinder 89. These annular grooves may contain a packing to seal the cylinder with respect to the plates, and the structure can be held together and the sealing action increased by extending rods 90 between the upper and lower plates 87 and 88, the upper ends of these rods being threaded to receive nuts 91 for this purpose. Correspondingly, the spring means 84, 85 is disposed in a sealed chamber and there is no danger of accumulation of foreign matter in the zone of the spring means such as would change or prevent the resilient action thereof. Likewise, there is no necessity for adjusting the spring means by turning of the nut 83 as this adjustment can be readily made by entering the space 19 and turning the adjustment sleeve 79.

If the treater thus far described is used for the resolution of crude oil emulsions, such emulsions will be delivered to the pipe 70 at elevated pressure by use of a pump 100. A heater 101 can be used to heat the emulsion either before or after passage through the pump 100.

If the treater shown in Figure 1 is to be used to remove foreign matter from an oil which contains no more than a small amount of water, a process similar to that described in the patent to Harold C. Eddy, No. 2,182,145 can be used. In this instance, a pump 103 may receive a relatively fresh water from a suitable source and move this water through a heater 104 and thence through a pipe 105 which joins the pipe 70 at a junction 106 where mixing with the oil takes place. If desired, suitable additional emulsifying means, for example a weight-loaded valve, can be disposed in the pipe 70 beyond the junction 106. Such mixing action will be used as will disperse the relatively fresh water in the incoming oil and produce an artificial emulsion capable of resolution with the aid of an electric field. When this emulsion is subjected to the action of the electric field in the treating space 27, the impurities in the oil can be brought into association with the dispersed relatively fresh water. These impurities may comprise water-soluble or water-wettable materials and, through the coalescing action of the electric field, will appear in the coalesced water masses which are separated and which collect to form the body of water 13.

Various changes can be made without departing from the spirit of the invention as defined in the appended claims.

We claim as our invention:

1. In an electric treater for resolving emulsions of the water-in-oil type, the combination of: a substantially spherical container providing a separating zone therein and having a side wall providing an internal surface which is substantially spherical in shape, said separating zone containing superimposed bodies of oil-continuous liquid and water-continuous liquid; outlet means at the upper and lower ends of said separating zone for respectively discharging said oil-continuous and water-continuous liquids therefrom; two horizontally disposed electrodes spaced vertically from each other to define a treating space and submerged in said oil-continuous liquid at a position near but somewhat above the midsection of said container which midsection is of larger size in horizontal cross section than sections thereabove and therebeneath whereby that portion of said side wall opposite said treating space diverges downwardly to said midsection, the lower of said electrodes providing a central throat communicating between said treating space and the liquid below said lower electrode; an emulsion distributor extending upward in said throat and providing an orifice extending substantially horizontally for discharging a stream of emulsion into said treating space to move radially outward therein for treatment and in a manner to be deflected downward by said downward-diverging portion of said side wall of said container to establish a return circulation of oil-continuous material inward beneath said lower electrode and upward through said throat into said treating space to re-treat the liquid moving in said circulation path; and means for establishing a potential difference between said horizontally-disposed electrodes to set up an electric field of sufficient intensity to coalesce the dispersed water of said emulsion whereby this coalesced water separates from the oil in said separating zone.

2. In an electric treater for emulsions, the combination of: a substantially spherical container; means for establishing a high intensity coalescing electric field within said substantially spherical container, said means including a pair of electrodes spaced from each other to define a treating space therebetween, said treating space providing exit means disposed near the horizontal midsectional plane of said substantially spherical container; means for continuously delivering a stream of said emulsion to said treating space to coalesce the dispersed phase thereof whereby the electrically-treated emulsion constituents move from said treating space through said exit means and into substantially that portion of the interior of said substantially spherical container which is of largest cross-sectional area in a horizontal plane to facilitate gravitational separation of the electrically-treated constituents; and means for continuously withdrawing the separated constituents respectively from the upper and lower ends of said substantially spherical container.

3. In an electric treater for emulsions, the combination of: a substantially spherical container having a side wall providing an internal surface which is substantially spherical in shape; field-establishing means in said substantially spherical container and comprising electrode means disposed near the center of said substantially spherical container; means for delivering a stream of emulsion of the water-in-oil type to the interior of said substantially spherical container near the horizontal midsection thereof to be acted upon by said electric field to coalesce the dispersed water and in a direction moving toward said internal surface of said container, the interior of said substantially spherical container comprising a separating zone in which the coalesced water may gravitate from the oil to provide bodies comprising oil-continuous material and water-continuous material, the surface of the latter body being substantially below the midsection of said container whereby said substantially spherical side wall slopes downwardly and inwardly to said surface of said body of water-continuous material to guide into this body the coalesced water gravitating from the oil; and outlet means at the upper and lower ends of said substantially spherical container and respectively communicating with said bodies to remove the separated oil-continuous and water-continuous material from said container.

4. A high-throughput electric treater for the resolution of emulsions of the water-in-oil type at high temperatures considerably above atmospheric temperature, said treater including, in combination: a substantially spherical container providing a substantially spherical side wall and containing hot bodies of oil-continuous material and water-continuous material comprising separated constituents of the emulsion, said bodies tending to cool through heat transferred to the atmosphere through said side wall of said container, this heat transfer being equalized at all peripheral portions of said container by the generally spherical form of said container, said body of water-continuous material providing a surface which is below the horizontal midsectional plane of largest diameter of said container whereby a portion of said side wall of said container curves inwardly from said midsectional plane to said surface of said body of water-continuous material; electrode means near said midsectional plane of said container and above said surface of said body of water-continuous material, said electrode means bounding a treating space and being adapted to be energized from a source of high potential current to establish a coalescing electric field in said treating space; means for continuously discharging a high-temperature emulsion of the water-in-oil type into said container to be acted upon by said electric field to coalesce the dispersed water droplets into masses of sufficient size to subside by gravity to said body of water-continuous material, said portion of said side wall curving inwardly from said midsectional plane to said surface of said body of water-continuous material being in the path of subsidence of coalesced water masses in the outer portion of the zone between said electrode means and said surface of said body of water-continuous material whereby such coalesced water masses gravitate into contact with said curving side wall to wet same and form a film of water flowing therealong to be guided directly into said body of water-continuous material by said portion of said side wall; means for continuously withdrawing oil-continuous material from the upper end of said substantially spherical container; and means for withdrawing water-continuous material from said body of water at a rate sufficient to maintain the surface of said body of water-continuous material below said midsectional plane and below said electrode means.

5. In a high-throughput electric treater for resolving emulsions of the water-in-oil type, the combination of: a substantially spherical container providing a substantially spherical inner surface bounding a treating-settling space containing oil-continuous material in its upper end and a body of separated water-continuous material in its lower end; a pair of electrodes; means for establishing a high-voltage coalescing electric field between said electrodes, said means including means for insulating said electrodes from each other and for mounting said electrodes within said oil-continuous material near the horizontal midsectional plane of said substantially spherical container and spaced from each other to provide an interelectrode treating space having an entrance portion and an exit portion, both of said entrance and exit portions opening on said oil-continuous material at positions spaced from each other; means for establishing a circulation of oil-continuous material moving into said entrance portion, through said inter-electrode space to and from said exit portion to return to said entrance portion through a return path, said circulation-establishing means including an emulsion discharge means providing a discharge orifice directed into said entrance portion and means for supplying the emulsion to be treated to said emulsion discharge means to jet a stream of the emulsion into said entrance portion of said interelectrode space to aspirate oil-continuous material into said entrance portion to flow in said circulation path, at least a portion of said return path being adjacent a portion of said substantially spherical inner surface of said container whereby such portion of said inner surface guides oil-continuous material issuing from said exit portion to flow in said return path to said entrance portion, the field in said interelectrode space coalescing the dispersed phase of said emulsion into masses of sufficient size to settle from said circulation to join said body of water-continuous material; and means for separately withdrawing oil-continuous material from the upper end of said container and water-continuous material from the body thereof in the lower end of said container.

6. In a high-throughput electric treater for resolving emulsions of the water-in-oil type of high temperatures considerably above atmospheric temperatures and characterized by its improved separating action arising at least in part from uniformity of temperature and flow conditions within the treater to the exclusion of stagnant zones subject to differential cooling, said electric treater including: a substantially spherical container providing a substantially spherical inner surface bounding a treating-settling space, said container containing hot oil-continuous material filling its upper end to a level below the horizontal equatorial plane of said container and hot water-continuous material filling the lower end of said container to such level; means for continuously discharging into said oil-continuous material a pressured stream of emulsion; means for heating the constituents of said emulsion prior to such discharge to a temperature substantially above atmospheric temperature whereby the oil-continuous and water-continuous materials in said container are of a temperature substantially above atmospheric temperature; means for establishing a high-intensity coalescing electric field in said oil-continuous material in the path of flow of said discharged emulsion to treat same by coalescing the dispersed phase of said emulsion into masses of sufficient size to gravitate from the oil of said emulsion, said field-establishing means including spaced electrode means defining a treating space in which said field is established, said treating space having an exit means near the horizontal equatorial plane of said container, the treated emulsion issuing from said exit means at a position within said oil-continuous material and near the horizontal equatorial plane of said container whereby settling of the larger of said coalesced masses takes place in a zone of large horizontal cross-sectional area near said equatorial plane; means for withdrawing water-continuous material from said body thereof at a rate to maintain said level substantially constant in position; and means for continuously withdrawing oil-continuous material from a withdrawal zone substantially at the extreme upper end of said container to establish a rising stream of the treated emulsion moving upwardly to said withdrawal zone from said zone in which said larger coalesced masses settle and with progressively increasing velocity because of confinement by the inner surface of said substantially spherical container to separate additional coalesced masses from the oil-continuous material of such upwardly moving stream, the outer portion of said rising stream flowing immediately adjacent the inner surface of said substantially spherical container to be subject to uniform heat loss through said container during continuous smooth flow of the rising stream to the exclusion of movement into stagnant zones of decreased velocity conductive to differential cooling of portions of such upwardly moving stream.

7. In a high-throughpart electric treater for resolving heated emulsions of the water-in-oil type, said electric treater including: a substantially spherical container providing a substantially spherical inner surface bounding a treating-settling space containing an upper body of oil-continuous material filling more than one-half of said container and containing a lower body of water-continuous material filling the remainder of said container; a pair of electrodes; means for mounting said electrodes within said body of oil-continuous material near the horizontal midsectional plane of said substantially spherical container in spaced relationship with each other and electrically insulated from each other; means for establishing a high-voltage coalescing electric field between said electrodes; means for producing a heated and pressured stream of emulsion of the water-in-oil type means for conducting said stream into said container and for discharging same into said body of oil-continuous material to enter said electric field to be treated thereby, said electric field being of sufficient intensity to coalesce the dispersed phase of said emulsion into aqueous masses of sufficient size to gravitate to said body of oil-continuous material; and means for respectively withdrawing oil-continuous and water-continuous materials from the respective bodies thereof.

LOGAN C. WATERMAN.
GORDON B. HANSON.

REFERENCES CITED

The following references are of record in the file of this patent:

UNITED STATES PATENTS

| Number | Name | Date |
|---|---|---|
| 1,430,246 | Meredith | Sept. 26, 1922 |
| 1,517,006 | Horton | Nov. 25, 1924 |
| 1,621,929 | Horton | Mar. 22, 1927 |
| 1,724,263 | Eddy | Aug. 13, 1929 |
| 1,838,913 | Eddy | Dec. 29, 1931 |
| 1,838,917 | Eddy et al. | Dec. 29, 1931 |
| 1,838,933 | Fisher | Dec. 29, 1931 |
| 1,838,980 | Worthington et al. | Dec. 29, 1931 |
| 1,885,601 | Horton | Nov. 1, 1932 |
| 2,033,152 | Roberts | Mar. 10, 1936 |
| 2,033,167 | Worthington | Mar. 10, 1936 |
| 2,033,418 | Eddy | Mar. 10, 1936 |
| 2,033,448 | Pettefer | Mar. 10, 1936 |
| 2,182,145 | Eddy | Dec. 5, 1939 |
| 2,341,044 | Jackson et al. | Feb. 8, 1944 |

Certificate of Correction

Patent No. 2,513,386                                                      July 4, 1950

LOGAN C. WATERMAN ET AL.

It is hereby certified that error appears in the printed specification of the above numbered patent requiring correction as follows:

Column 2, line 8, for the word "conductive" read *conducive*; column 12, line 1, for "high-throughpart" read *high-throughput*; line 51, list of references cited, for the patent number "2,033,448" read *2,033,446*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
                                                                         *Assistant Commissioner of Patents.*